United States Patent [19]

Swenson et al.

[11] 4,178,772

[45] * Dec. 18, 1979

[54] HEAT PUMP SYSTEM

[75] Inventors: Paul F. Swenson, Cleveland, Ohio; Paul B. Moore, Fedhaurn, Fla.

[73] Assignee: Consolidated Natural Gas Service Company, Inc., Cleveland, Ohio

[*] Notice: The portion of the term of this patent subsequent to Nov. 1, 1994, has been disclaimed.

[21] Appl. No.: 845,229

[22] Filed: Oct. 25, 1977

Related U.S. Application Data

[63] Continuation-in-part of Ser. No. 737,776, Nov. 1, 1976, Pat. No. 4,055,964.

[51] Int. Cl.² .................. F25B 27/02; F25B 13/00; F25B 1/00
[52] U.S. Cl. .................................. 62/238; 62/324; 62/501; 165/62
[58] Field of Search .............. 62/238, 324, 501; 165/62

[56] References Cited

U.S. PATENT DOCUMENTS

| 2,952,138 | 9/1960 | Russell et al. | 62/238 |
|---|---|---|---|
| 2,990,694 | 7/1961 | Kummerlowe et al. | 62/238 C |
| 3,153,442 | 10/1964 | Silvern | 62/238 |
| 3,276,226 | 10/1966 | Osborne | 62/501 |
| 3,301,000 | 1/1967 | Holbay | 62/501 |
| 3,385,348 | 5/1968 | Enburg | 62/501 |
| 3,400,554 | 9/1968 | Dennis et al. | 62/238 |
| 3,487,655 | 1/1970 | Dennis et al. | 62/160 |
| 3,803,847 | 4/1974 | McAlister | 62/324 |
| 3,805,540 | 4/1974 | Schwartzman | 62/238 C |
| 4,055,964 | 11/1977 | Swenson et al. | 62/238 C |

Primary Examiner—Lloyd L. King
Attorney, Agent, or Firm—Pearne Gordon Sessions

[57] ABSTRACT

An air heating and cooling system for a building includes an expansion-type refrigeration circuit and a heat engine. The refrigeration circuit includes two heat exchangers, one of which is communicated with a source of indoor air from the building and the other of which is communicated with a source of air from outside the building. The heat engine includes a heat rejection circuit having a source of rejected heat and a primary heat exchanger connected to the source of rejected heat. The heat rejection circuit also includes an evaporator in heat exchange relation with the primary heat exchanger, a heat engine indoor heat exchanger, and a heat engine outdoor heat exchanger. The indoor heat exchangers are disposed in series air flow relationship, with the heat engine indoor heat exchanger being disposed downstream from the refrigeration circuit indoor heat exchanger. The outdoor heat exchangers are also disposed in series air flow relationship, with the heat engine outdoor heat exchanger disposed downstream from the refrigeration circuit outdoor heat exchanger. A common fluid is used in both of the indoor heat exchangers and in both of the outdoor heat exchangers. In a first embodiment, the heat engine is a Rankine cycle engine. In a second embodiment, the heat engine is a non-Rankine cycle engine.

40 Claims, 2 Drawing Figures

HEAT PUMP SYSTEM

The government of the United States of America has rights in this invention pursuant to Contract Number EY-76-C-02-2883*0000 awarded by the U.S. Energy Research and Development Administration.

CROSS REFERENCE TO RELATED APPLICATIONS

This application is a continuation-in-part of U.S. Pat. application Ser. No. 737,776, filed Nov. 1, 1976, now U.S. Pat. No. 4,055,964, granted Nov. 1, 1977 the entirety of which is incorporated herein by reference as though fully repeated.

BACKGROUND AND SUMMARY OF THE INVENTION

The present invention relates generally to a heating and cooling system, and more particularly to a fuel-fired heating and cooling system which is energy-efficient on both the cooling mode of operation and the heating mode of operation.

A variety of heat-powered heating and cooling systems for buildings has been provided by the prior art. Such systems typically include a vapor power circuit such as a steam power circuit having a prime mover expander, such as a turbine. The prime mover expander drives a compressor within a refrigeration circuit which is used as a reversible heat pump for heating and cooling the building.

One such prior art system, as shown in U.S. Pat. No. 3,400,554, utilizes the rejected heat from the vapor power circuit prime mover expander to supplement the heat furnished by the reversible refrigeration circuit when the system is on the heating mode. Another prior art system, as shown in U.S. Pat. No. 3,487,655, utilizes the prime mover expander to drive an alternator which provides electrical power for an electric motor-driven compressor and for the associated electric motor-driven pump fans.

The present invention departs from these and other prior art air heating and cooling systems by providing an air heating and cooling system having series heat exchange for refrigeration and heat engine power circuits both inside the building and outside the building. The system includes an expansion-type refrigeration circuit having a compressor, an indoor heat exchanger, and an outdoor heat exchanger. The system also includes a heat engine having a heat rejection circuit which includes a source of rejected heat, a primary heat exchanger connected to the source of rejected heat, an evaporator in heat exchange relation with the primary heat exchanger, an indoor heat exchanger, and an outdoor heat exchanger. The two series indoor heat exchangers and the two series outdoor heat exchangers are arranged with the refrigeration circuit heat exchangers upstream in the air flow path of the heat engine heat rejection heat exchangers. A first fan arrangement conducts air across the indoor heat exchangers and a second fan arrangement conducts air across the outdoor heat exchangers.

When the system is in a heating mode of operation, the indoor refrigeration circuit heat exchanger serves as a condenser to provide one stage of heating for the indoor air, and the indoor heat engine heat rejection circuit heat exchanger receives the rejected heat from the heat engine to provide a second stage of heating for the indoor air. The outdoor heat exchanger of the heat engine heat rejection circuit does not receive rejected heat from the heat engine during the heating mode.

When the system is on the cooling mode of operation, the indoor refrigeration circuit heat exchanger serves as an evaporator to cool the indoor air, and the rejected heat from the heat engine is directed away from the indoor heat rejection circuit heat exchanger. The outdoor refrigeration circuit heat exchanger functions as a condenser, and the rejected heat from the heat engine is conveyed to the outdoor heat rejection circuit heat exchanger during the cooling mode.

The heat engine also drives an alternator which provides electrical power to the first and second fan arrangements. As the speed of the heat engine is increased, the electrical power output of the alternator increases to increase the speed of the fans and thereby increase air flow across both the indoor and outdoor heat exchangers.

During very cold weather, vapor from a vapor generator is incrementally injected directly into the heat engine heat rejection circuit to increase the heating capacity of the system and avoid undesirable compressor operating conditions.

The use of the primary heat exchanger and evaporator and indoor and outdoor heat exchangers in the heat engine heat rejection circuit produces a number of advantages for the system. The fluid used in the evaporator and indoor and outdoor heat exchangers of the heat rejection circuit can be in the same fluid which is used in the indoor and outdoor heat exchangers of the refrigeration circuit. The hardware in the system is thus simplified, since smaller hardware can be used than would be required if steam and water vapor were circulated in the heat rejection circuit indoor and outdoor heat exchangers. Additionally, a common valve can be used for switching from the heating mode to the cooling mode on both the heat rejection circuit and the refrigeration circuit, since any normal leakage in the valve from one of the circuits to the other circuit is not objectionable when the same fluid is used in both circuits. Still further, freeze protection is not required for the indoor and outdoor heat exchangers of the heat rejection circuit when a fluid having a very low freezing point is used in place of water and steam.

According to another aspect of the invention, the outlets of the outdoor heat exchangers are connected through a back pressure regulator, and the outlets of the indoor heat exchangers are also connected through a back pressure regulator when the same fluid is used in both indoor heat exchangers and in both outdoor heat exchangers to further simplify the hardware components of the system. Additionally, the inlet sides of the outdoor heat exchangers are connected by a valve, and the inlet sides of the indoor heat exchangers are connected by another valve to permit both indoor heat exchangers or both outdoor heat exchangers to be used as the evaporator for the refrigeration circuit.

Although the system is described herein with reference to indoor and outdoor air, the system can also be used with indoor and outdoor fluids other than air, such as water or brine. Additionally, the indoor and outdoor fluids need not be the same fluid, for example when the indoor fluid is air and the outdoor fluid is ocean brine.

BRIEF DESCRIPTION OF THE DRAWINGS

These and other aspects and advantages of the invention will become apparent upon an understanding of the embodiments of the invention shown in the drawings, wherein.

DETAILED DESCRIPTION OF THE DRAWINGS

Figure 1:
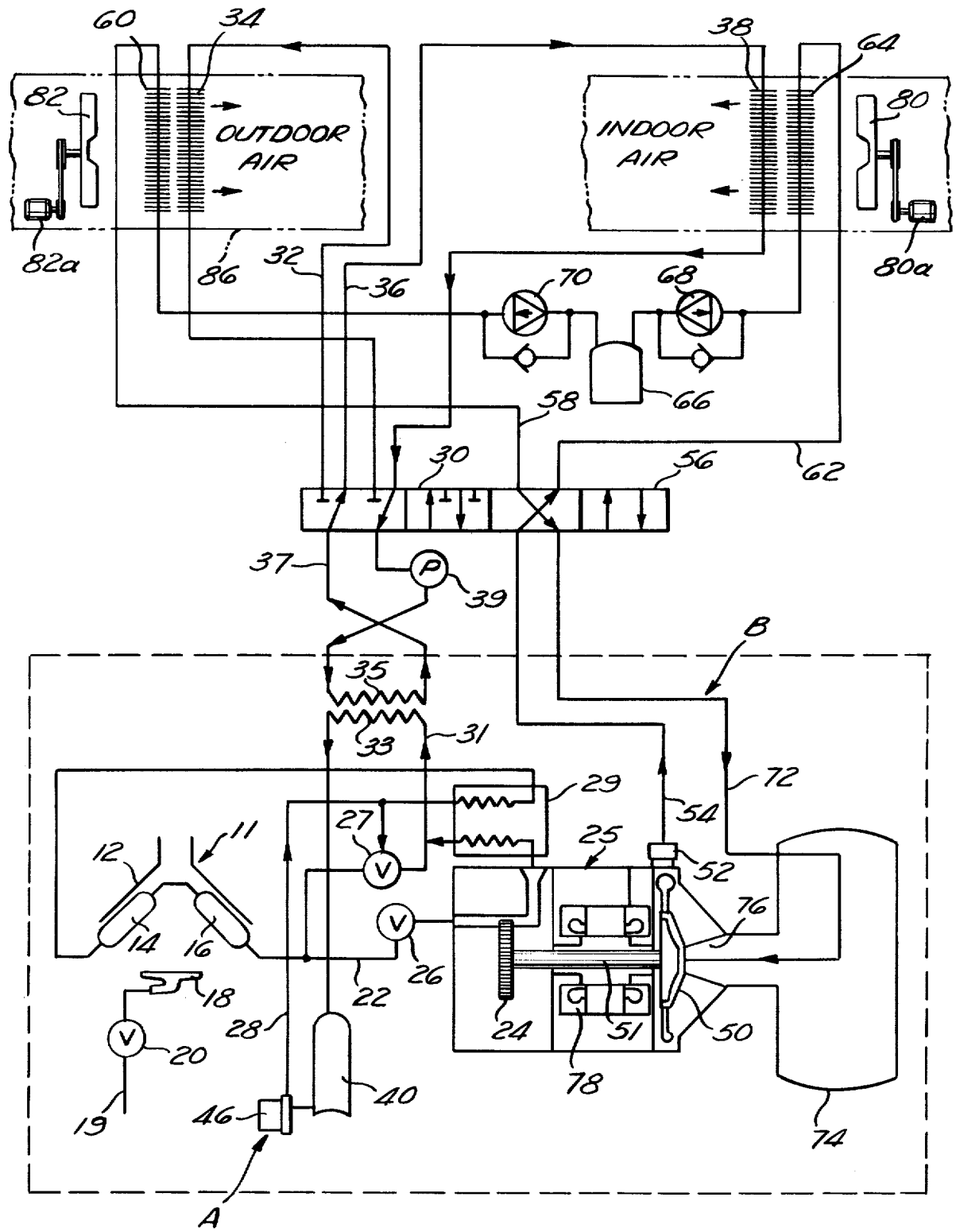
FIG. 1 is a schematic view of a first embodiment of a heating and cooling system according to the invention.

Referring now to FIG. 1 in greater detail, the first embodiment of the air heating and cooling system includes a heat engine A and an expansion-type refrigeration circuit B.

The heat engine A is a closed loop vapor power circuit and includes a gas-fired vapor generator 11 having an insulated housing 12 with an evaporator section 14 connected in series with a superheater section 16. The gas-fired vapor generator 11 includes a burner 18 supplied with natural gas by a supply line 19, which is controlled by a conventional temperature-responsive valve 20 regulated in response to the temperature of steam leaving the superheater 16.

The steam leaving the superheater 16 is conducted by a line 22 to an inlet nozzle or nozzles of an axial flow steam turbine 24 of a turbo-generator unit 25. The turbine 24 may be constructed in any appropriate manner, such as shown in U.S. Pat. No. 3,400,554, the entirety of which is incorporated herein by reference. Supply of steam to the turbine 24 is controlled by a throttling valve 26. The valve 26 is opened or closed by any suitable means, such as a device (not shown) which senses thermostat error and compressor speed and outdoor ambient temperature to maintain a predetermined compressor speed for any given combination of thermostat error and outdoor ambient temperature.

A second throttling valve 27 provides a source of additional heat when required on the heating mode, as explained below. The valve 27 also serves as an attemperator, mixing water from a line 28 with the superheated steam from the vapor generator 11 so that the source of additional heat is at a lower temperature and a considerably lower level of superheat than the superheated steam from the vapor generator 11. The valve 27 is proportionally controlled by a device (not shown) which senses thermostat error and compressor speed. The valve 27 is arranged to supply the proper amount of additional heat that is required when maximum desirable compressor speed has already been reached, as explained below.

The exhaust steam from the prime mover expander or turbine 24 passes through a regenerator 29, which preheats the water entering the vapor generator 11. Exhaust steam from the regenerator 29 is then carried by a line 31 to a primary heat exchanger or condenser 33. The primary heat exchanger 33 is arranged in heat exchange relationship with an ebullient evaporator or secondary heat exchanger 35 so that the heat which is rejected by the fluid condensing in the condenser 33 is transmitted to the ebullient which evaporates in the evaporator 35. A pump 39 supplies return liquid to the evaporator 35, and the output displacement of the pump 39 is controlled by a liquid level control (not shown) which senses the level of liquid in the evaporator 35.

The vapor from the evaporator 35 is carried by a line 37 to a bidirectional valve portion 30. The bidirectional valve portion 30 is arranged to direct the vapor from the evaporator 35 to a line 32 to an outdoor heat exchanger 34, or alternatively to a line 36 to an indoor heat exchanger 38. The heat exchangers 34 and 38 are air-cooled and are sized so that either heat exchanger by itself has sufficient capacity to function as the condenser for the maximum output of the vapor power circuit A.

The fluid used in the evaporator 35 and lines 32 and 36 and heat exchangers 34 and 38 is preferably a relatively commonly used, commercially available fluid, such as a fluid of the halocarbon family. In the preferred embodiment, this fluid is the same fluid which is used in the refrigeration circuit B and is the refrigeration fluid commonly designated R 11.

The condensate from the condenser 33 is directed to a standpipe 40, which in turn is connected to a feed pump 46. The feed pump 46 is an electric motor-driven pump whose speed is matched to the requirements of the entire system, as described more fully below. The pump 46 completes the vapor power circuit by pumping the condensate from the standpipe 40 through the regenerator 29 to the vapor generator 11. The pump 46 also provides condensate to the valve 27 as needed, as discussed above. The entire vapor power circuit A is hermetically sealed to eliminate the need for make-up water in the system. The pressure within the vapor generator 11 acts upon the feed pump 46 to control the discharge rate of the feed pump 46, and hence control the pressure in line 22.

The closed loop refrigeration circuit B includes a high speed centrifugal compressor 50 which is drivingly connected to the turbine 24 by a suitable drive shaft 51. The compressor 50 has an outlet 52 which is connected by a line 54 to a valve portion 56. The valve portion 56 selectively directs the output from the compressor 50 through a line 58 to an outdoor heat exchanger 60, or alternatively through a line 62 to an indoor heat exchanger 64. The heat exchangers 60 and 64 are air-cooled, and are sized so that either heat exchanger has sufficient capacity to function as the condenser for the refrigeration circuit B.

As shown in FIG. 1, the valve portions 30 and 56 are arranged in a single valve housing. In the preferred embodiment, the valve portions 30 and 56 are spool valves. Because the fluid flowing through the valve portions 30 and 56 is the same, intermixing of the fluids caused by normal leakage is not objectionable.

When the outdoor heat exchanger 60 receives the output from the compressor 50 and functions as a condenser, the heat exhanger 60 has its outlet connected through a liquid accumulator 66 and expansion valve 68 to the indoor heat exchanger 64, which then serves as an evaporator. Similarly, when the output from the compressor 50 is connected directly to the indoor heat exchanger 64, so that the indoor heat exchanger 64 functions as the condenser, the outlet of the heat exchanger 64 is connected through the liquid accumulator 66 and expansion valve 70 to the heat exchanger 60, which then serves as an evaporator. The outlet from the evaporator is then connected through a line 72 and a surge tank 74 to the inlet 76 of the compressor 50.

The fluid used in the refrigeration circuit B is preferably a relatively commonly used commercially available fluid, such as a fluid of the halocarbon family. In the preferred embodiment, the fluid used in the refrigeration circuit B is the same R 11 fluid mentioned above in connection with the heat engine heat rejection circuit.

The turbo-compressor unit 25 also includes an alternator 78 disposed along the drive shaft 51 between the turbine 24 and the compressor 50. The electrical output from the alternator 78 is electrically connected to an indoor electric motor-driven fan arrangement 80 which includes an electric motor 80a which provides air flow across the indoor heat exchangers 64 and 38, and to an outdoor electric motor-driven fan arrangement 82 which includes an electric motor 82a and which provides air flow across the outdoor heat exchangers 60 and 34, and to the electric motor-driven condensate pump 46. In this manner, the speed of the fan arrangements 80 and 82 is matched to the speed of the turbine 24 and compressor 50. This ensures that the fan arrangements 80 and 82 operate at lower speeds when the turbine 24 and compressor 50 operate at lower speeds, and that the fan arrangements 80 and 82 operate at higher speeds when the turbine 24 and compressor 50 operate at higher speeds.

The reference herein to the heat exchangers 38 and 64 as being indoor heat exchangers means that they are disposed in a duct or passage 84 through which fluid is circulated to and from the inside of a building by operation of the fluid moving arrangement 80 in the direction indicated by the arrow in the duct 84. Similarly, the reference herein to the heat exchangers 34 and 60 as being outdoor heat exchangers means that they are disposed in a duct or passage 86 through which fluid from outside of the building circulates by operation of the fluid moving arrangement 82 in the direction indicated by the arrow in the duct 86.

As explained further below, the condenser 33, evaporator 35, valve portion 30, indoor heat exchanger 38, and outdoor heat exchanger 34 provide a heat rejection circuit for the rejected heat from the turbine or heat engine 24. The rejected heat is advantageously employed to heat the indoor air during a heating mode of operation and is transferred to outdoor air during a cooling mode of operation. Because the fluid used in the evaporator 35 and heat exchangers 34 and 38 is R 11 refrigerant, rather than water, any danger of freezing in the valve portion 30 or in the lines 32 and 36, or in the heat exchangers 34 and 38, is eliminated. Additionally, the lines 32 and 34 can be made smaller in cross sectional area. Still further, the use of a common refrigerant permits the valve portions 30 and 56 to be assembled in a single valve housing, since any normal fluid leakage between the valve portions 30 and 56 is not objectionable.

The components of the system shown in FIG. 1 are preferably arranged in a three-compartment housing in the manner shown in the above-referenced United States patent application Ser. No. 737,776, filed Nov. 1, 1976. In this arrangement, the components shown within the dotted outline in FIG. 1 are all arranged in a separate housing or compartment which is insulated sufficiently that the pilot for the burner 18 is able to maintain the temperature within the housing or compartment above freezing under all conditions. If desired, the valve portion 30 and valve portion 56 may also be arranged inside the housing indicated by the dotted lines for convenience, although this is not necessary for freeze protection purposes. With particular reference to FIGS. 5-8 of United States patent application Ser. No. 737,776, filed Nov. 1, 1976, the components shown in FIG. 1 of the present application are arranged in the identical manner as the components of the same reference numerals in patent application Ser. No. 737,776, now U.S. Pat. No. 4,055,964 and the condenser 33 and evaporator 35 are placed in the top portion of the chamber 96 shown in FIGS. 5 through 8 of United States patent application Ser. No. 737,776, now U.S. Pat. No. 4,055,964.

The air heating and cooling system shown in FIG. 1 is placed in the cooling mode of operation by moving the valve portion 30 to a position connecting the outlet of the evaporator 35 to the line 32 and outside heat exchanger 34, and discontinuing flow of vapor from the outlet of the evaporator 35 to the inside heat exchanger 38. The valve portion 56 is moved to a position connecting the outlet line 54 from the compressor outlet 52 to the line 58 leading to the outdoor heat exchanger 60, and connecting the line 62 leading from the indoor heat exchanger 64 to the line 72 leading to the compressor 76. With the valve portions 30 and 56 in this position, the outdoor vapor power circuit heat exchanger 34 transfers the rejected heat from the steam turbine 24 to the outside air. The indoor refrigeration circuit heat exchanger 38 serves as an evaporator, and the outdoor refrigeration circuit heat exchanger 60 serves as a condenser for the refrigeration circuit B.

During this cooling mode of operation, the outdoor air flows in series first through the refrigeration circuit heat exchanger 60 and then through the vapor power circuit heat exchanger 34. The refrigeration circuit condenser 60 is arranged to operate at a lower temperature than the vapor power circuit condenser 34; hence outside air flowing through the outdoor heat exchangers is progressively heated first by the refrigeration circuit heat exchanger 60 and then by the vapor power circuit heat exchanger 34. In this manner, the single fan arrangement 82 provides air flow through both the refrigeration circuit condenser and the vapor power circuit condenser when the air heating and cooling system is on the cooling mode. On the cooling mode, this series arrangement of the outdoor heat exchangers increases the coefficient of performance of the system (the ratio of the heating or cooling effect achieved to the energy consumed by the system for a given total heat exchanger face area perpendicular to outdoor air flow and a given heat exchanger bulk and weight and a given amount of power for moving the outdoor air). This is because the face area of the outdoor heat exchangers perpendicular to the outdoor air flow is maximized by this arrangement and the operating temperature of the upstream refrigeration circuit heat exchanger 60 is minimized to cause a reduction in compressor work which more than compensates for the slight pressure drop imposed in the air flow by the downstream heat exchanger 38.

Although in the above description of the system on the cooling mode of operation it is assumed that the flow of vapor from the outlet of the evaporator 37 to the inside heat exchanger 38 is fully discontinued, such flow may alternatively be only partially discontinued by operation of the valve portion 30 so that a small amount of vapor still flows to the inside heat exchanger 38. This could be done when it is desired to use the system to dehumidify the air inside the building without lowering the temperature of the air. Under these conditions of operation, the series air flow relationship of the inside heat exchangers advantageously permits the air to be dehumidified by the heat exchanger 64 and then permits the dehumidified air to be warmed to the desired temperature by the heat exchanger 38.

When the system shown in the drawings is placed in the heating mode of operation, the valve portion 30 is moved to a position directing rejected heat from the evaporator 35 to the indoor heat exchanger 38 and discontinuing flow of vapor from the evaporator 35 to the outdoor heat exchanger 34. The valve portion 56 is moved to a position connecting the compressor outlet 52 to the indoor heat exchanger 64 and connecting the line 58 from the outdoor heat exchanger 60 to the line 72 leading to the compressor inlet 76. Under these conditions, the indoor refrigeration circuit heat exchanger 64 functions as a condenser and the outdoor refrigeration circuit heat exchanger 60 functions as the evaporator.

During the heating mode, the fan arrangement 80 circulates return air from the building first across the refrigeration circuit heat exchanger 64 and then across the heat engine heat exchanger 38. The refrigeration circuit heat exchanger 64 provides a first increase in temperature of the building air and the heat engine heat exchanger 38 provides a second increase in temperature of the building air so that the heated air supplied to the building is at a temperature of approximately 120 degrees Fahrenheit. This provides a series heat exchange for the indoor air so that the indoor air is progressively heated first by the pumped heat from the refrigeration circuit B and then by rejected heat from the vapor power circuit A.

The pumped heat and the steam turbine exhaust heat are sufficient to heat the building in which the system is used at ambient temperatures above 20 degrees Fahrenheit. At ambient temperatures less than 20 degrees Fahrenheit, the pumped heat and the steam turbine exhaust do not provide sufficient heat to heat the building. This condition at which the pumped heat and the steam turbine exhaust heat are not sufficient to provide the desired heating of the building is determined by a proportional control thermostat (not shown) when the building air is not maintained at the desired temperature. When this occurs, the thermostat opens the valve 27 the necessary amount to inject steam from the line 22 into the line 31 leading to the condenser 33.

As the ambient temperature decreases further below 20 degrees Fahrenheit, the amount of pumped heat available decreases and the amount of heat available from the steam turbine exhaust also decreases. As this occurs, the amount of heat provided by the direct steam injection from the vapor generator 11 through the valve 27 increases until an ambient temperature of minus 10 degrees Fahrenheit is reached. At this temperature, the refrigeration circuit B is no longer capable of absorbing heat from the outdoor air and transferring it to the indoor air. Under these conditions, the entire heating load of the building is met by direct injection of heat from the vapor generator 11 into the condenser 33.

During the heating mode of operation, the outdoor refrigeration circuit heat exchanger 60, which is the evaporator on the heating mode, operates at a temperature slightly below ambient temperature so that the refrigerant absorbs heat from the outdoor air. The indoor refrigeration circuit heat exchanger 64, which functions as the condenser on the heating mode of operation, operates at temperatures below the operating temperature of the vapor power circuit condenser 38. This difference in operating temperatures of the indoor heat exchangers 64 and 38 provides the above-described stepped series heat exchange for the indoor air of the building during the heating mode of operation.

This series arrangement of the indoor heat exchangers increases the coefficient of performance of the system on the heating mode. This is because the face area of the indoor heat exchangers perpendicular to the indoor air flow is maximized by this arrangement, and the operating temperature of the upstream refrigeration circuit heat exchanger 64 is minimized to cause a reduction in compressor work and to permit the heat pump to pump heat at lower outdoor ambient temperatures. Additionally, this is accomplished without necessitating a different indoor air flow path on the heating mode than on the cooling mode.

Figure 2:
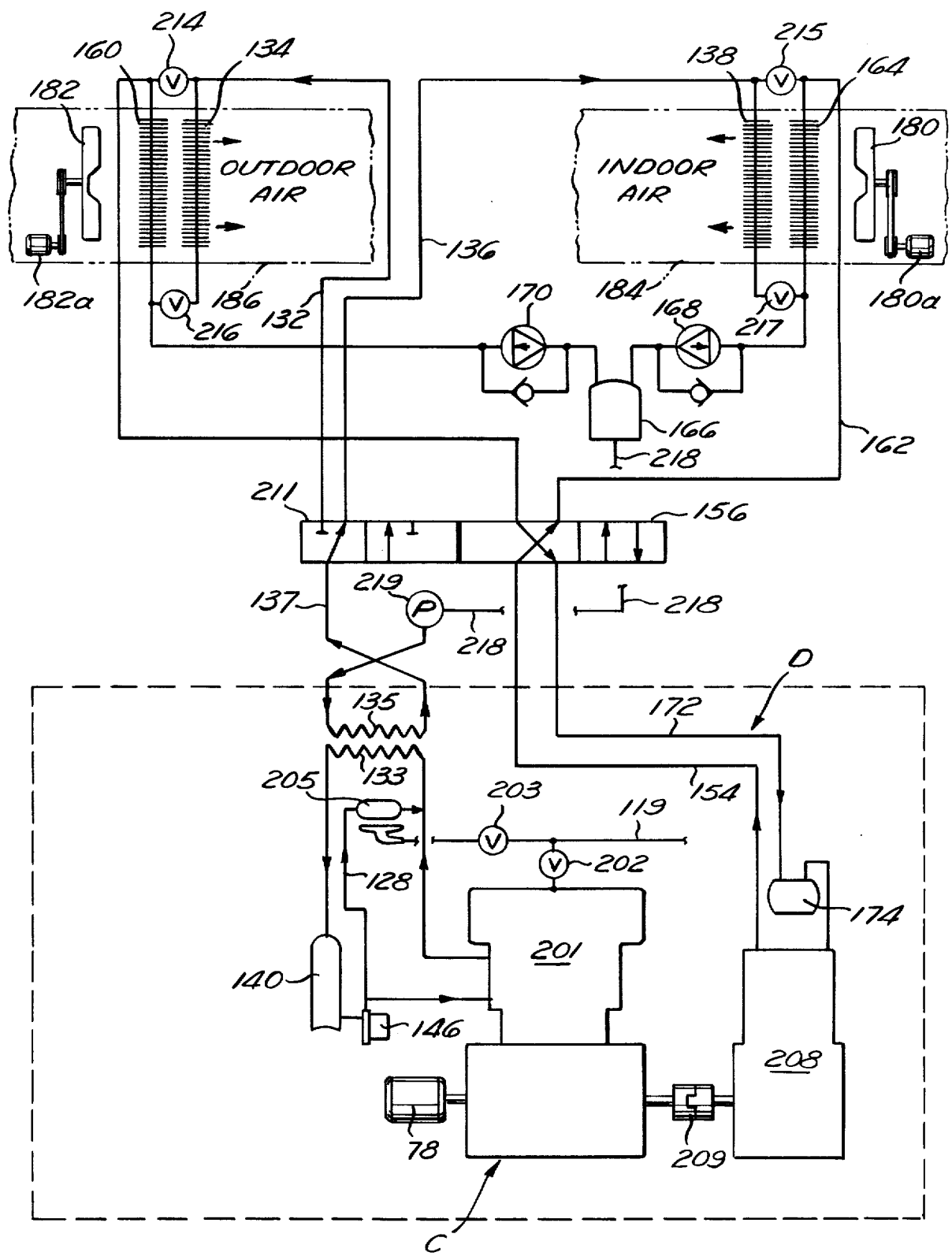
FIG. 2 is a schematic view of a second embodiment of a heating and cooling system according to the invention.

A second embodiment of the invention is illustrated in FIG. 2 of the drawings. The component parts of the system shown in FIG. 2 which are of the same structure and function as the corresponding parts of the embodiment shown in FIG. 1 are labeled with reference numerals which are the same as the reference numerals of FIG. 1 but preceded by the number 1. The structure and function of such components are not further described, but the differences and additional features of the system shown in FIG. 2 as compared with the system shown in FIG. 1 are so described.

The air heating and cooling system shown in FIG. 2 includes a non-Rankine heat engine C having a heat rejection circuit and an expansion-type refrigeration circuit D.

The non-Rankine heat engine C may be, for example, a Stirling or Otto or Diesel or Brayton engine. In the preferred embodiment, the heat engine C is a Stirling engine 201, which is supplied with natural gas by a supply line 119 which is controlled by a valve 202. The valve 202 is opened or closed by any suitable means, such as a two-stage thermostat (not shown) which opens the valve 202 in response to a first predetermined thermostat error such as, for example, one Fahrenheit degree.

The exhaust steam from the heat rejection surfaces of the Stirling engine 201 is carried by the line 31 to the primary heat exchanger or condenser 133. The pump 146 is of sufficient size and capacity to pump enough fluid through the Stirling engine 201 that under no conditions does all of the pumped fluid vaporize. This is done so that adequate liquid is always present to move all of the vapor bubbles from the heat rejection surfaces of the Stirling engine and thereby eliminate an accumulation of such vapor bubbles on the heat rejection surfaces. In the preferred embodiment, the heat rejection surfaces of the Stirling engine 201 comprise a vapor generator and are the outside surfaces of many small diameter tubes (not shown) which are closely spaced and which carry the working gas of the Stirling engine. The preferred embodiment of the Stirling engine 201 is well known in the art and is disclosed in the book G.M.R. Stirling Thermal Engine Part of The Stirling Engine Story—1960 Chapter, by Gregory Flynn, Jr., Wrth H. Percival, and F. Earl Heffner. This book is the third printing of the original preprint of the General Motors Research Laboratories Stirling Thermal Engine paper which was originally presented at the 1960 Society of Automotive Engineers' annual meeting held in Detroit, Mich. in January 1960. The paper has been published in the S.A.E. Transactions Volume 68, 1960, with the oral discussions of the meeting included in that printing. The book includes the text of these discussions as it appeared in the transactions. The book and the published S.A.E. Transactions Volume 68, 1960 are both incorporated herein by reference as though fully reprinted.

The primary heat exchanger 133 is arranged in heat exchange relationship with an ebullient evaporator or secondary heat exchanger 135 so that the heat which is rejected by the fluid condensing in the condenser 133 is transmitted to the ebullient in the evaporator 135 in the same manner as discussed above in connection with FIG. 1.

The vapor from the evaporator 135 is carried by the line 137 to a valve portion 211. The valve portion 211 is similar to the valve portion 30 shown in FIG. 1, except that the valve portion 211 does not receive fluid back from the heat exchangers 134 and 138. Instead, return of fluid to the evaporator 135 is provided by a line 218 and pump 219. The output displacement of the pump 219 is controlled by a liquid level valve (not shown) which senses the level of liquid in the evaporator 135.

A second control valve 203 controls the supply of natural gas to an auxiliary gas-fired vapor generator 204 which includes an evaporator section 205 and a burner 206. The second control valve 203 is also controlled by the two-stage thermostat (not shown) which opens the valve 203 in response to a second predetermined thermostat error such as, for example, three Fahrenheit degrees. Thus, the vapor generator 204 is arranged to supply the proper amount of additional heat that is required when the refrigeration circuit D is unable to heat the inside building air to the desired temperature. This supply of additional heat is provided in the same manner and under the same conditions of ambient outdoor temperature and heat pump capability as the supply of additional heat discussed above in connection with FIG. 1.

The closed loop refrigeration circuit D includes a reciprocating heat pump compressor 208, which is drivingly connected to the Stirling engine 201 by a suitable drive shaft 209. An alternative means (not shown) for coupling a Stirling engine to a heat pump compressor is by inertial suspension. With this alternative system, in a manner known in the art, the engine casing of the Stirling engine shakes in reaction to movement of the engine pistons. The engine casing, in turn, shakes the body of a free piston compressor to eliminate the drive shaft 209.

The inlets of the two outdoor heat exchangers 134 and 160 are connected by an on-off valve 214. In a similar manner, the inlets of the two indoor heat exchangers 138 and 164 are connected by an on-off valve 215. The outlets of the two outdoor heat exchangers 134 and 160 are connected by a back pressure regulator 216. Similarly, the outlets of the two indoor heat exchangers 138 and 164 are connected by a back pressure regulator 217.

The back pressure regulators can be passive regulators which maintain a predetermined constant back pressure in the heat exchangers 134 and 138, respectively, relative to the pressures in the heat exchangers 160 and 164, respectively. However, it is preferred that the back pressure regulators 216 and 217 be active components which regulate the amount of back pressure to provide a predetermined degree of subcooling in the condensed fluid when the heat exchanger 134 or 138 is functioning as the condenser, as described more fully below. This is accomplished by providing two refrigerant temperature sensors (not shown) in each of the back pressure regulated heat exchangers 134 and 138. One of the temperature sensors is arranged at the condenser outlet, and the other is arranged inside the condenser. The temperature difference between the two sensors indicates the amount of subcooling in a well known manner. In this manner, the back pressure regulators 216 and 217 maintain the pressure in the heat exchangers 134 and 138, respectively, at a pressure sufficient to ensure complete condensing and a small predetermined amount of subcooling of the fluid flowing through the heat exchangers when the heat exchangers are performing a condensing function, as described more fully below.

During the heating mode of operation, the valve 215 is closed and the back pressure regulator 217 is controlled in the manner described above to ensure complete condensing of the fluid flowing through the heat exchanger 138. The series air heating of the indoor air by the heat exchanger 164 and 138 then occurs in the same manner as described above in connection with FIG. 1.

During this heating mode of operation, the valve 214 is opened and the back pressure regulator 216 is bypassed. By this arrangement, fluid from the expansion valve 170 passes through both outdoor heat exchangers 134 and 160 so that both of the outdoor heat exchangers serve as evaporators for the refrigeration circuit. This provides a substantially increased heat exchanger surface area both for the refrigerant and for the air for the refrigeration circuit evaporator during the heating mode of operation.

During the cooling mode of operation, the valve 214 is closed and the back pressure regulator 216 ensures full condensation of fluid in the heat exchanger 134. The phased heat exchange for the outdoor air during the cooling mode then occurs as described above in connection with FIG. 1.

During this cooling mode of operation, the valve 215 is open and the back pressure regulator 217 is bypassed. In this manner, fluid from the expansion valve 168 flows through both of the heat exchangers 138 and 164 so that both indoor heat exchangers serve as evaporators during the cooling mode of operation. This substantially increases the heat exchange surface area both for the refrigerant and for the air for the refrigeration circuit evaporator during the cooling mode of operation.

Referring now to FIGS. 1 and 2 together, the components disposed within the dotted lines in FIG. 2 may be substituted for the components disposed within the dotted lines in FIG. 1, and vice versa. In this manner, the advantages obtained by use of the valves 214, 215, 216, and 217 with the non-Rankine circuit of FIG. 2 may also be advantageously employed in the Rankine circuit of FIG. 1.

What is claimed is:
1. A fluid heating and cooling system comprising:
 a refrigeration circuit having a compressor with an inlet and an outlet, an indoor refrigeration circuit heat exchanger, and an outdoor refrigeration circuit heat exchanger,
 a heat engine, said heat engine having a heat rejection circuit with means for receiving rejected heat from said heat engine, a primary heat exchanger connected to said means for receiving rejected heat, an evaporator in heat exchange relation with said primary heat exchanger, a heat engine indoor heat exchanger, a heat engine outdoor heat exchanger,
 first fluid moving means for conducting a first fluid in series across both of said indoor heat exchangers,
 second fluid moving means for conducting a second fluid in series across both of said outdoor heat exchangers,
 means for drivingly interconnecting said heat engine with said compressor, first valve means movable to a cooling position for discontinuing flow of vapor from said evaporator to said heat engine indoor heat exchanger when said heat engine is drivingly connected to said compressor, second valve means movable to a heating position for discontinuing flow of vapor from said evaporator to said heat engine outdoor heat exchanger when said heat engine is drivingly connected to said compressor, third valve means movable to a cooling position for connecting said compressor outlet to said refrigeration circuit outdoor heat exchanger when said first valve means is moved to said cooling position, fourth valve means movable to a heating position for connecting said compressor outlet to said refrigeration circuit indoor heat exchanger when said second valve means is moved to said heating position.

2. A fluid heating and cooling system as set forth in claim 1, said heat engine indoor heat exchanger being disposed downstream in the fluid flow from said refrigeration circuit indoor heat exchanger under all conditions of heating and cooling, and said heat engine outdoor heat exchanger being disposed downstream in the fluid flow from said refrigeration circuit outdoor heat exchanger under all conditions of heating and cooling.

3. A fluid heating and cooling system as set forth in claim 2, including first duct means defining a first series air flow path across both of said indoor heat exchangers, and second duct means defining a second series air flow path across both of said outdoor heat exchangers.

4. A fluid heating and cooling system as set forth in claim 2, said heat engine being a prime mover expander connected to a vapor generator.

5. A fluid heating and cooling system as set forth in claim 2, said heat engine being a non-Rankine cycle engine.

6. A fluid heating and cooling system as set forth in claim 2, said refrigeration circuit indoor and outdoor heat exchangers using a predetermined heat exchange fluid, and said heat engine evaporator and indoor and outdoor heat exchangers also using said predetermined heat exchange fluid.

7. A fluid heating and cooling system as set forth in claim 6, said indoor and outdoor heat exchangers each having an inlet and an outlet, fifth valve means connecting said outlets of said indoor heat exchangers, and sixth valve means connecting said outlets of said outdoor heat exchangers.

8. A fluid heating and cooling system as set forth in claim 7, said fifth and sixth valve means each being a back pressure regulator for maintaining fluid in said heat engine heat exchanger at a greater pressure level than fluid in said refrigeration heat exchanger, seventh valve means connecting said inlets of said indoor heat exchangers, and eighth valve means connecting said inlets of said outdoor heat exchangers.

9. A fluid heating and cooling system comprising:
a refrigeration circuit having a compressor with an inlet and an outlet, an indoor refrigeration circuit heat exchanger, and an outdoor refrigeration circuit heat exchanger,
a power circuit having a vapor generator with an inlet and an outlet, a prime mover, a power circuit condenser connected to said vapor generator outlet, a power circuit evaporator in heat exchange relation with said power circuit condenser, a power circuit indoor heat exchanger, a power circuit outdoor heat exchanger,
first fluid moving means for conducting a first fluid in series across both of said indoor heat exchangers,
second fluid moving means for conducting a second fluid in series across both of said outdoor heat exchangers,
means for drivingly interconnecting said prime mover with said compressor,
first valve means movable to a cooling position for discontinuing flow of vapor from said power circuit evaporator to said power circuit indoor heat exchanger when said prime mover is drivingly connected to said compressor,
second valve means movable to a heating position for discontinuing flow of vapor from said power circuit evaporator to said power circuit outdoor heat exchanger when said prime mover is drivingly connected to said compressor,
third valve means movable to a cooling position for connecting said compressor outlet to said refrigeration circuit outdoor heat exchanger when said first valve means is moved to said cooling position,
fourth valve means movable to a heating position for connecting said compressor outlet to said refrigeration circuit indoor heat exchanger when said second valve means is moved to said heating position.

10. A fluid heating and cooling system comprising:
a refrigeration circuit having a compressor with an inlet and an outlet, an indoor refrigeration circuit heat exchanger, and an outdoor refrigeration circuit heat exchanger,
a power circuit having a vapor generator with an inlet and an outlet, a prime mover, an indoor power circuit heat exchanger, an outdoor power circuit heat exchanger,
first fluid moving means for conducting a first fluid in series across both of said indoor heat exchangers,
second fluid moving means for conducting a second fluid in series across both of said outdoor heat exchangers,
means for drivingly interconnecting said prime mover with said compressor,
first valve means movable to a cooling position for discontinuing flow of heat from said vapor generator outlet to said power circuit indoor heat exchanger when said prime mover is drivingly connected to said compressor,
second valve means movable to a heating position for discontinuing flow of heat from said vapor generator outlet to said power circuit outdoor heat exchanger when said prime mover is drivingly connected to said compressor,
third valve means movable to a cooling position for connecting said compressor outlet to said refrigeration circuit outdoor heat exchanger when said first valve means is moved to said cooling position,
fourth valve means movable to a heating position for connecting said compressor outlet to said refrigeration circuit indoor heat exchanger when said second valve means is noved to said heating position,
and the same heat exchange fluid flowing through both of said indoor heat exchangers and through both of said outdoor heat exchangers and through said first and second and third and fourth valve means.

11. A fluid heating and cooling system as set forth in claim 10, said power circuit indoor heat exchanger being disposed downstream in the fluid flow from said refrigeration circuit indoor heat exchanger under all conditions of heating and cooling, and said power circuit outdoor heat exchanger being disposed downstream in the fluid flow from said refrigeration circuit outdoor heat exchanger under all conditions of heating and cooling.

12. A fluid heating and cooling system as set forth in claim 11, said first and second and third and fourth valve means all being disposed in a single integral valve housing.

13. A fluid heating and cooling system comprising:
a refrigeration circuit having a compressor with an inlet and an outlet, an indoor refrigeration circuit heat exchanger, and an outdoor refrigeration circuit heat exchanger,
a vapor power circuit having a vapor generator with an inlet and an outlet, a prime mover expander having an inlet and an outlet, means connecting said vapor generator outlet with said prime mover expander inlet, a vapor power circuit condenser, a vapor power circuit evaporator in heat exchange relation with said vapor power circuit condenser, a vapor power circuit indoor heat exchanger, a vapor power circuit outdoor heat exchanger,
first fluid moving means for conducting a first fluid in series across both of said indoor heat exchangers,
second fluid moving means for conducting a second fluid in series across both of said outdoor heat exchangers,
means for drivingly interconnecting said prime mover expander with said compressor,
first valve means movable to a cooling position for discontinuing flow of vapor from said vapor power circuit evaporator to said vapor power circuit indoor heat exchanger when said prime mover expander is drivingly connected to said compressor,
second valve means movable to a heating position for discontinuing flow of vapor from said vapor power circuit evaporator to said vapor power circuit outdoor heat exchanger when said prime mover expander is drivingly connected to said compressor,
third valve means movable to a cooling position for connecting said compressor outlet to said refrigeration circuit outdoor heat exchanger when said first valve means is moved to said cooling position,
fourth valve means movable to a heating position for connecting said compressor outlet to said refrigeration circuit indoor heat exchanger when said second valve means is moved to said heating position.

14. A fluid heating and cooling system as set forth in claim 13, said vapor power circuit indoor heat exchanger being disposed downstream in the fluid flow from said refrigeration circuit indoor heat exchanger under all conditions of heating and cooling, and said vapor power circuit outdoor heat exchanger being disposed downstream in the fluid flow from said refrigeration circuit outdoor heat exchanger under all conditions of heating and cooling.

15. A fluid heating and cooling system as set forth in claim 14, including first duct means defining a first series air flow path across both of said indoor heat exchangers, and second duct means defining a second series air flow path across both of said outdoor heat exchangers.

16. A fluid heating and cooling system comprising:
a refrigeration circuit having a compressor with an inlet and an outlet, an indoor refrigeration circuit heat exchanger, and an outdoor refrigeration circuit heat exchanger,
a vapor power circuit having a vapor generator with an inlet and an outlet, a prime mover expander having an inlet and an outlet, means connecting said vapor generator outlet with said prime mover expander inlet, an indoor vapor power circuit heat exchanger, an outdoor vapor power circuit heat exchanger,
first fluid moving means for conducting a first fluid in series across both of said indoor heat exchangers,
second fluid moving means for conducting a second fluid in series across both of said indoor heat exchangers,
means for drivingly interconnecting said prime mover expander with said compressor,
first valve means movable to a cooling position for discontinuing flow of heat from said prime mover expander outlet to said vapor power circuit indoor heat exchanger when said prime mover expander is drivingly connected to said compressor,
second valve means movable to a heating position for discontinuing flow of heat from said prime mover expander outlet to said vapor power circuit outdoor heat exchanger when said prime mover expander is drivingly connected to said compressor,
third valve means movable to a cooling position for connecting said compressor outlet to said refrigeration circuit outdoor heat exchanger when said first valve means is moved to said cooling position,
fourth valve means movable to a heating position for connecting said compressor outlet to said refrigeration circuit indoor heat exchanger when said second valve means is moved to said heating position,
and the same heat exchange fluid flowing through both of said indoor heat exchangers and through both of said outdoor heat exchangers and through said first and second and third and fourth valve means.

17. A fluid heating and cooling system comprising:
a refrigeration circuit having a compressor with an inlet and an outlet, an indoor refrigeration circuit heat exchanger, and an outdoor refrigeration circuit heat exchanger,
a non-Rankine heat engine, said heat engine having a heat rejection circuit with means for receiving rejected heat from said heat engine, a heat engine indoor heat exchanger, a heat engine outdoor heat exchanger,
first fluid moving means for conducting a first fluid in series across both of said indoor heat exchangers,
second fluid moving means for conducting a second fluid in series across both of said outdoor heat exchangers,
means for drivingly interconnecting said heat engine with said compressor,
first valve means movable to a cooling position for discontinuing flow of heat from said means for receiving rejected heat to said heat engine indoor heat exchanger when said heat engine is drivingly connected to said compressor,
second valve means movable to a heating position for discontinuing flow of heat from said means for receiving rejected heat to said heat engine outdoor heat exchanger when said heat engine is drivingly connected to said compressor,
third valve means movable to a cooling position for connecting said compressor outlet to said refrigeration circuit outdoor heat exchanger when said first valve means is moved to said cooling position, fourth valve means movable to a heating position for connecting said compressor outlet to said refrigeration circuit indoor heat exchanger when said second valve means is moved to said heating position.

18. A fluid heating and cooling system as set forth in claim 17, said heat engine indoor heat exchanger being disposed downstream in the fluid flow from said refrigeration circuit indoor heat exchanger under all conditions of heating and cooling, and said heat engine outdoor heat exchanger being disposed downstream in the fluid flow from said refrigeration circuit outdoor heat exchanger under all conditions of heating and cooling.

19. A fluid heating and cooling system as set forth in claim 18, including first duct means defining a first series air flow path across both of said indoor heat exchangers, and second duct means defining a second series air flow path across both of said outdoor heat exchangers.

20. A fluid heating and cooling system as set forth in claim 17, said heat engine being a Stirling cycle engine.

21. A fluid heating and cooling system as set forth in claim 17, said heat rejection circuit including a condenser connected to said source of rejected heat, an evaporator in heat exchange relation with said condenser, and means connecting said evaporator and said heat engine indoor and outdoor heat exchangers.

22. In a building having an inside and an outside, an air heating and cooling system comprising:

an expansion type refrigeration circuit having a compressor with an inlet and an outlet, an indoor refrigeration circuit heat exchanger, an outdoor refrigeration circuit heat exchanger, and conduit means connecting said compressor outlet with each of said refrigeration circuit indoor and outdoor heat exchangers, a power circuit having a heat engine with heat rejection surfaces, an indoor power circuit heat exchanger, an outdoor power circuit heat exchanger, conduit means connecting said heat rejection surfaces with each of said power circuit indoor and outdoor heat exchangers, first air moving means conducting air from inside said building in series across both of said indoor heat exchangers, second air moving means conducting air from outside said building in series across both of said outdoor heat exchangers, means drivingly interconnecting said heat engine with said compressor, first valve means movable to a cooling position for discontinuing flow of heat from said heat engine heat rejection surfaces to said power circuit indoor heat exchanger when said heat engine is drivingly connected to said compressor, second valve means movable to a heating position for discontinuing flow of heat from said heat engine heat rejection surfaces to said power circuit outdoor heat exchanger when said heat engine is drivingly connected to said compressor, third valve means movable to a cooling position for connecting said compressor outlet to said refrigeration circuit outdoor heat exchanger when said first valve means is moved to said cooling position, fourth valve means movable to a heating position for connecting said compressor outlet to said refrigeration circuit indoor heat exchanger when said second valve means is moved to said heating position.

23. An air heating and cooling system as set forth in claim 22, including a housing compartment, said heat engine and compressor being disposed inside said housing compartment, and said indoor heat exchangers and outdoor heat exchangers being disposed outside said housing compartment.

24. A fluid heating and cooling system comprising:

a refrigeration circuit having a compressor with an inlet and an outlet, an indoor refrigeration circuit heat exchanger, and an outdoor refrigeration circuit heat exchanger, a power circuit having a heat engine with heat rejection surfaces, a condenser connected to said heat rejection surfaces, an evaporator in heat exchange relation with said condenser, a power circuit indoor heat exchanger, a power circuit outdoor heat exchanger, first fluid moving means for conducting a first fluid in series across both of said indoor heat exchangers, second fluid moving means for conducting a second fluid in series across both of said outdoor heat exchangers, means for drivingly interconnecting said prime mover expander with said compressor, first valve means movable to a cooling position for discontinuing flow of vapor from said evaporator to said power circuit indoor heat exchanger when said prime mover expander is drivingly connected to said compressor, second valve means movable to a heating position for discontinuing flow of vapor from said evaporator to said power circuit outdoor heat exchanger when said prime mover expander is drivingly connected to said compressor, third valve means movable to a cooling position for connecting said compressor outlet to said refrigeration circuit outdoor heat exchanger when said first valve means is moved to said cooling position, fourth valve means movable to a heating position for connecting said compressor outlet to said refrigeration circuit indoor heat exchanger when said second valve means is moved to said heating position.

25. A fluid heating and cooling system as set forth in claim 24, said power circuit indoor heat exchanger being disposed downstream in the fluid flow from said refrigeration circuit indoor heat exchanger under all conditions of heating and cooling, and said vapor power circuit outdoor heat exchanger being disposed downstream in the fluid flow from said refrigeration circuit outdoor heat exchanger under all conditions of heating and cooling.

26. A fluid heating and cooling system as set forth in claim 24, said refrigeration circuit indoor and outdoor heat exchangers using a predetermined heat exchange fluid, and said power circuit evaporator and indoor and outdoor heat exchangers also using said predetermined heat exchanger fluid.

27. A fluid heating and cooling system as set forth in claim 26, said indoor and outdoor heat exchangers each having an inlet and an outlet, fifth valve means connecting said outlets of said indoor heat exchangers, and sixth valve means connecting said outlets of said outdoor heat exchangers.

28. A fluid heating and cooling system as set forth in claim 26, fifth valve means connecting said inlets of said indoor heat exchangers, and sixth valve means connecting said inlets of said outdoor heat exchangers.

29. A fluid heating and cooling system as set forth in claim 24, including a housing compartment, said compressor and heat engine and condenser and evaporator each being disposed inside said housing compartment, said indoor heat exchangers and said outdoor heat exchangers each being disposed outside of said housing compartment.

30. A fluid heating and cooling system comprising:

a refrigeration circuit having a compressor with an inlet and an outlet, an indoor refrigeration circuit heat exchanger and an outdoor refrigeration circuit heat exchanger, a non-Rankine heat engine, said heat engine having a heat rejection circuit with means for receiving rejected heat from said heat engine, a heat engine indoor heat exchanger, a heat engine outdoor heat exchanger, first fluid moving means for conducting a first fluid in series across both of said indoor heat exchangers, second fluid moving means for conducting a second fluid in series across both of said outdoor heat exchangers, means for drivingly interconnecting said heat engine with said compressor, first valve means movable to a cooling position for discontinuing flow of heat from said source of rejected heat to said heat engine indoor heat exchanger when said heat engine is drivingly connected to said compressor, second valve means movable to a heating position for discontinuing flow of heat from said source of rejected heat to said heat engine outdoor heat exchanger when said heat engine is drivingly connected to said compressor, third valve means movable to a cooling position for connecting said compressor outlet to said refrigeration circuit outdoor heat exchanger when said first valve means is moved to said cooling position, fourth valve means movable to a heating position for connecting said compressor circuit to said refrigeration circuit indoor heat exchanger when said second valve means is moved to said heating position, and the same heat exchange fluid flowing through both of said indoor heat exchangers and through both of said outdoor heat exchangers and through said first and second and third and fourth valve means.

31. A fluid heating and cooling system as set forth in claim 30, said first and second and third and fourth valve means being disposed in a single integral valve housing.

32. A fluid heating and cooling system comprising:

a refrigeration circuit having a compressor with an inlet and an outlet, an indoor refrigeration circuit heat exchanger, and an outdoor refrigeration circuit heat exchanger, a power circuit having a vapor generator with an inlet and an outlet, a prime mover, an indoor power circuit heat exchanger, an outdoor power circuit heat exchanger, first fluid moving means for conducting a first fluid in series across both of said indoor heat exchangers, second fluid moving means for conducting a second fluid in series across both of said outdoor heat exchangers, means for drivingly interconnecting said prime mover with said compressor, first valve means movable to a cooling position for discontinuing flow of heat from said vapor generator outlet to said power circuit indoor heat exchanger when said prime mover is drivingly connected to said compressor, second valve means movable to a heating position for discontinuing flow of heat from said vapor generator outlet to said power circuit outdoor heat exchanger when said prime mover is drivingly connected to said compressor, third valve means movable to a cooling position for connecting said compressor outlet to said refrigeration circuit outdoor heat exchanger when said first valve means is moved to said cooling position, fourth valve means movable to a heating position for connecting said compressor outlet to said refrigeration circuit indoor heat exchanger when said second valve means is moved to said heating position, the same heat exchange fluid flowing through both of said indoor heat exchangers and through both of said outdoor heat exchangers and through said first and second and third and fourth valve means, each of said heat exchangers having an inlet and an outlet, fifth valve means connecting said outlets of said indoor heat exchangers, said fifth valve means being a back pressure regulator for maintaining the fluid pressure in said power circuit indoor heat exchanger above the fluid pressure in said refrigeration circuit indoor heat exchanger.

33. A fluid heating and cooling system as in claim 32, including sixth valve means connecting said outlets of said outdoor heat exchangers, said sixth valve means being a back pressure regulator for maintaining the fluid pressure in said power circuit outdoor heat exchanger above the fluid pressure in said refrigeration circuit outdoor heat exchanger.

34. A fluid heating and cooling system comprising:

a refrigeration circuit having a compressor with an inlet and an outlet, an indoor refrigeration circuit heat exchanger, and an outdoor refrigeration circuit heat exchanger, a power circuit having a vapor generator with an inlet and an outlet, a prime mover, an indoor power circuit heat exchanger, an outdoor power circuit heat exchanger, first fluid moving means for conducting a first fluid in series across both of said indoor heat exchangers, second fluid moving means for conducting a second fluid in series across both of said outdoor heat exchangers, means for drivingly interconnecting said prime mover with said compressor, first valve means movable to a cooling position for discontinuing flow of heat from said vapor generator outlet to said power circuit indoor heat exchanger when said prime mover is drivingly connected to said compressor, second valve means movable to a heating position for discontinuing flow of heat from said vapor generator outlet to said power circuit outdoor heat exchanger when said prime mover is drivingly connected to said compressor, third valve means movable to a cooling position for connecting said compressor outlet to said refrigeration circuit outdoor heat exchanger when said first valve means is moved to said cooling position, fourth valve means movable to a heating position for connecting said compressor outlet to said refrigeration circuit indoor heat exchanger when said second valve means is moved to said heating position, the same heat exchange fluid flowing through both of said indoor heat exchangers and through both of said outdoor heat exchangers and through said first and second and third and fourth valve means, each of said heat exchangers having an inlet and an outlet, fifth valve means connecting said inlets of said outdoor heat exchangers, said fifth valve means being open so that both of said outdoor heat exchangers serve as the refrigeration circuit evaporator when said second and fourth valve means are in said heating positions.

35. A fluid heating and cooling system as in claim 34, including sixth valve means connecting said inlets of said indoor heat exchangers, said sixth valve means being open so that both of said indoor heat exchangers serve as the refrigeration circuit evaporator when said first and third valve means are in said cooling positions.

36. A fluid heating and cooling system comprising:

a refrigeration circuit having a compressor with an inlet and an outlet, an indoor refrigeration circuit heat exchanger, and an outdoor refrigeration circuit heat exchanger, a vapor power circuit having a vapor generator with an inlet and an outlet, a prime mover expander having an inlet and an outlet, means connecting said vapor generator outlet with said prime mover expander inlet, and indoor vapor power circuit heat exchanger, an outdoor vapor power circuit heat exchanger, first fluid moving means for conducting a first fluid in series across both of said indoor heat exchangers, second fluid moving means for conducting a second fluid in series across both of said indoor heat exchangers, means for drivingly interconnecting said prime mover expander with said compressor, first valve means movable to a cooling position for discontinuing flow of heat from said prime mover expander outlet to said vapor power circuit indoor heat exchanger when said prime mover expander is drivingly connected to said compressor, second valve means movable to a heating position for discontinuing flow of heat from said prime mover expander outlet to said vapor power circuit outdoor heat exchanger when said prime mover expander is drivingly connected to said compressor, third valve means movable to a cooling position for connecting said compressor outlet to said refrigeration circuit outdoor heat exchanger when said first valve means is moved to said cooling position, fourth valve means movable to a heating position for connecting said compressor outlet to said refrigeration circuit indoor heat exchanger when said second valve means is moved to said heating position;

the same heat exchange fluid flowing through both of said indoor heat exchangers and through both of said outdoor heat exchangers and through said first and second and third and fourth valve means, each of said heat exchangers having an inlet and an outlet, fifth valve means connecting said outlets of said indoor heat exchangers, sixth valve means connecting said outlets of said outdoor heat exchangers, said fifth and sixth valve means each being a back pressure regulator for maintaining the fluid pressure in its associated vapor power circuit heat exchanger above the fluid pressure in its associated refrigeration circuit heat exchanger.

37. A fluid heating and cooling system as in claim 36, including seventh valve means connecting said inlets of said indoor heat exchangers, eighth valve means connecting said inlets of said outdoor heat exchangers, whereby both of said indoor heat exchangers serve as the evaporator for said refrigeration circuit when said first and third valve means are in said cooling positions, and whereby both of said outdoor heat exchangers serve as the evaporator for said refrigeration circuit when said second and fourth valve means are in said heating positions.

38. A fluid heating and cooling system comprising:

a refrigeration circuit having a compressor with an inlet and outlet, an indoor refrigeration circuit heat exchanger and an outdoor refrigeration circuit heat exchanger, a non-Rankine heat engine, said heat engine having a heat rejection circuit with means for receiving rejected heat from said heat engine, a heat engine indoor heat exchanger, a heat engine outdoor heat exchanger, first fluid moving means for conducting a first fluid in series across both of said indoor heat exchangers, second fluid moving means for conducting a second fluid in series both of said outdoor heat exchangers, means for drivingly interconnecting said heat engine with said compressor, first valve means movable to a cooling position for disconnecting flow of heat from said source of rejected heat to said heat engine indoor heat exchanger when said heat engine is drivingly connected to said compressor, second valve means movable to a heating position for discontinuing flow of heat from said source of rejected heat to said heat engine outdoor heat exchanger when said heat engine is drivingly connected to said compressor, third valve means movable to a cooling position for connecting said compressor outlet to said refrigeration circuit outdoor heat exchanger when said first valve means is moved to said cooling position, fourth valve means movable to a heating position for connecting said compressor outlet to said refrigeration circuit indoor heat exchanger when said second valve means is moved to said heating position, the same heat exchange fluid flowing through both of said indoor heat exchangers and through both of said indoor heat exchangers and through said first and second and third and fourth valve means, each of said heat exchangers having an inlet and an outlet, fifth valve means connecting said outlets of said indoor heat exchangers, sixth valve means connecting said outlets of said outdoor heat exchangers, said fifth and sixth valve means each being a back pressure regulator for maintaining the fluid pressure in its associated heat engine heat exchanger above the fluid pressure in its associated refrigeration circuit heat exchanger.

39. A fluid heating and cooling system as in claim 38, including seventh valve means connecting said inlets of said indoor heat exchangers, eighth valve means connecting said inlets of said outdoor heat exchangers, whereby both of said indoor heat exchangers serve as the evaporator for said refrigeration circuit when said first and third valve means are in said cooling positions, and whereby both of said outdoor heat exchangers serve as the evaporator for said refrigeration circuit when said second and fourth valve means are in said heating positions.

40. A fluid heating and cooling system comprising:

a refrigeration circuit having a compressor with an inlet and an outlet, an indoor refrigeration circuit heat exchanger, and an outdoor refrigeration circuit heat exchanger, a non-Rankine heat engine, said heat engine having a heat rejection circuit with means for receiving rejected heat from said heat engine, a heat engine indoor heat exchanger, a heat engine outdoor heat exchanger, an auxiliary vapor generator, means for connecting said auxiliary vapor generator to said means for receiving rejected heat, first fluid moving means for conducting a first fluid in series across both of said indoor heat exchangers, second fluid moving means for conducting a second fluid in series across both of said outdoor heat exchangers, means for drivingly interconnecting said heat engine with said compressor, first valve means movable to a cooling position for discontinuing flow of heat from said means for receiving rejected heat to said heat engine indoor heat exchanger when said heat engine is drivingly connected to said compressor, second valve means movable to a heating position for discontinuing flow of heat from said means for receiving rejected heat to said heat engine outdoor heat exchanger when said heat engine is drivingly connected to said compressor, third valve means movable to a cooling position for connecting said compressor outlet to said refrigeration circuit outdoor heat exchanger when said first valve means is moved to said cooling position, fourth valve means movable to a heating position for connecting said compressor outlet to said refrigeration circuit indoor heat exchanger when said second valve means is moved to said heating position.

* * * * *